United States Patent
Griffin et al.

(10) Patent No.: US 6,508,374 B1
(45) Date of Patent: Jan. 21, 2003

(54) FILLER NECK CLOSURE WITH STATIC CHARGE DISSIPATER

(75) Inventors: Jeffery Griffin, Connersville, IN (US); Lisa Levi, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 13 days.

(21) Appl. No.: 09/706,031

(22) Filed: Nov. 3, 2000

Related U.S. Application Data

(60) Provisional application No. 60/163,613, filed on Nov. 4, 1999.

(51) Int. Cl.[7] .............................................. B65D 53/00
(52) U.S. Cl. ............................. 220/304; 220/DIG. 33; 220/86.2; 220/288
(58) Field of Search ........................ 220/304, DIG. 32, 220/DIG. 33, 86.2, 288

(56) References Cited

U.S. PATENT DOCUMENTS

| | | |
|---|---|---|
| 3,831,801 A | 8/1974 | Rodgers |
| 4,065,026 A | 12/1977 | Williams et al. ............ 220/304 |
| 4,177,931 A | 12/1979 | Evans |
| 4,228,915 A * | 10/1980 | Hooper et al. .......... 220/304 X |
| 4,299,102 A | 11/1981 | Aro ............................. 70/165 |
| 4,305,522 A * | 12/1981 | Gerdes ............ 220/DIG. 33 X |
| 4,540,103 A | 9/1985 | Kasugai et al. |
| 4,561,559 A | 12/1985 | Rutan et al. |
| 4,572,396 A | 2/1986 | Kasugai et al. |
| 4,588,102 A | 5/1986 | Kasugai |
| 4,597,504 A | 7/1986 | Witt ........................ 220/88 R |
| 4,666,056 A | 5/1987 | Kasugai et al. |
| 4,715,509 A | 12/1987 | Ito et al. ................... 220/86 R |
| 4,719,949 A | 1/1988 | Mears ........................ 141/301 |
| 4,724,868 A | 2/1988 | Kasugai et al. |
| 4,726,488 A | 2/1988 | Kasugai et al. |
| 4,730,652 A | 3/1988 | Bartholomew |
| 4,765,505 A * | 8/1988 | Harris ............. 220/DIG. 33 X |

(List continued on next page.)

FOREIGN PATENT DOCUMENTS

| | | |
|---|---|---|
| DE | 4214076 A | 11/1992 |
| EP | 0 748 712 A1 * | 12/1996 |
| EP | 0827914 A2 | 3/1998 |
| EP | 1 068 948 A2 * | 1/2001 |
| GB | 2255554 A2 | 11/1992 |
| JP | 9-286499 * | 11/1997 |
| WO | WO 99/05026 | 2/1999 |
| WO | WO 00/02778 | 1/2000 |
| WO | WO 00/20292 | 4/2000 |

OTHER PUBLICATIONS

Translation of claims of Registered Japanese Patent No. 3200732.

Primary Examiner—Lee Young
Assistant Examiner—Robin A. Hylton
(74) Attorney, Agent, or Firm—Barnes & Thornburg

(57) ABSTRACT

A fuel cap fuel system and method establishing a common electric potential and preventing escape of fuel vapors as used with a fuel system. The cap includes a fuel port closure for engaging a fuel receiving assembly, and an electrically conductive retainer carried on the fuel cap. An electrical charge is passed from an operator of the fuel cap, through the cap, and to the electrically conductive retainer and to the fuel receiving assembly. As the cap is removed from the fuel receiving assembly, the conductive retainer maintains a conductive contact with the fuel receiving assembly to convey a charge therethrough. As fuel vapor escapes from the fuel receiving assembly, the electrical contact is maintained. The seal is disengaged from the fuel port after the cap and fuel receiving assembly achieve a generally common electrical potential.

30 Claims, 2 Drawing Sheets

U.S. PATENT DOCUMENTS

| | | | |
|---|---|---|---|
| 4,779,755 A | * 10/1988 | Harris | 220/DIG. 33 X |
| 4,785,961 A | 11/1988 | Kasugai et al. | |
| 4,790,449 A | * 12/1988 | Kyokuichi et al. | 220/DIG. 33 X |
| 4,795,050 A | 1/1989 | Smith et al. | |
| 4,795,053 A | 1/1989 | Kasugai et al. | |
| 4,815,705 A | 3/1989 | Kasugai et al. | |
| 4,854,471 A | 8/1989 | Kasugai et al. | |
| 4,944,425 A | 7/1990 | Kasugai et al. | |
| 4,974,307 A | 12/1990 | Uebayashi et al. | |
| 4,993,578 A | 2/1991 | Kerby | |
| 5,148,934 A | 9/1992 | Kasugai et al. | |
| 5,203,466 A | 4/1993 | Kasugai et al. | |
| 5,238,136 A | 8/1993 | Kasugai et al. | |
| 5,279,439 A | 1/1994 | Kasugai et al. | |
| 5,395,004 A | 3/1995 | Griffin et al. | |
| 5,397,608 A | 3/1995 | Soens | |
| 5,449,086 A | 9/1995 | Harris | 220/288 |
| 5,520,300 A | 5/1996 | Griffin | |
| 5,540,347 A | 7/1996 | Griffin | |
| 5,615,793 A | * 4/1997 | Muller | 220/86.2 X |
| 5,638,975 A | 6/1997 | Harris | 220/288 |
| 5,975,328 A | 11/1999 | Hagano et al. | |
| 5,992,669 A | 11/1999 | Hagano et al. | |
| 5,992,670 A | * 11/1999 | Hagano et al. | 220/DIG. 33 X |
| 5,992,672 A | * 11/1999 | Hagano et al. | 220/304 |
| 5,996,829 A | * 12/1999 | Hagano et al. | 220/DIG. 33 X |
| 5,996,830 A | 12/1999 | Hagano et al. | 220/203.28 |
| 6,003,709 A | 12/1999 | Hagano et al. | 220/88.1 |
| 6,179,148 B1 | 1/2001 | Harris | 220/288 |
| 6,197,858 B1 | 3/2001 | Hagano et al. | |
| 6,308,852 B1 | 10/2001 | Hagano et al. | |
| 2001/0013367 A1 | 8/2001 | Miura et al. | |

* cited by examiner

FILLER NECK CLOSURE WITH STATIC CHARGE DISSIPATER

This application claims priority under 35 U.S.C. 119(e) to U.S. Provisional Application Serial No. 60/163,613, filed Nov. 4, 1999, which is expressly incorporated herein by reference.

BACKGROUND AND SUMMARY OF THE INVENTION

The present invention relates to a fuel cap, and particularly to a fuel cap for closing a vehicle fuel tank filler neck. More particularly, the present invention relates to an electrically conductive fuel cap.

Occasionally, vehicle occupants or service station attendants will "carry" a static electricity charge having an electrical potential that is higher than the vehicle itself. A fuel cap in accordance with the present invention is configured to "ground" a person touching the fuel cap prior to removal of the fuel cap from the filler neck so as to dissipate to ground, in a controlled manner, any electrostatic charge or potential on the person at the outset of a vehicle refueling cycle and before fuel vapor is allowed to vent through the mouth of the filler neck.

In a preferred embodiment, the fuel cap includes a handle, a fuel port closure for engaging a fuel receiving assembly, an electrically conductive retainer on the fuel cap and a seal. The electrically conductive retainer maintains an electrically conductive contact to the fuel receiving assembly while the seal prevents the escape of fuel vapors through the fuel receiving assembly. The seal is maintained until substantially achieving a common electrical potential between the cap and the fuel receiving assembly by way of the electrically conductive retainer.

The invention also includes a method of establishing a common electrical potential and preventing escape of fuel vapors from a fuel port of a fuel receiving assembly prior to establishing the common electrical potential. The method employs a fuel receiving assembly which defines a fuel port, a fuel cap which is engageable with and covers the fuel port. The cap includes an electrically conductive retainer, a handle, a fuel port closure and a seal. The seal is maintained between the cap and the fuel receiving assembly. When the cap is engaged with the fuel receiving assembly. A common electrically conductive path is established between the electrically conductive retainer and an electrically conductive portion of the fuel receiving assembly. The electrically conductive path is maintained between the retainer and the fuel receiving assembly until the common electrical potential is achieved. The seal is maintained and only disengaged after substantially achieving the common electrical potential.

Additional features and advantages of the invention will become apparent to those skilled in the art upon a consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2:
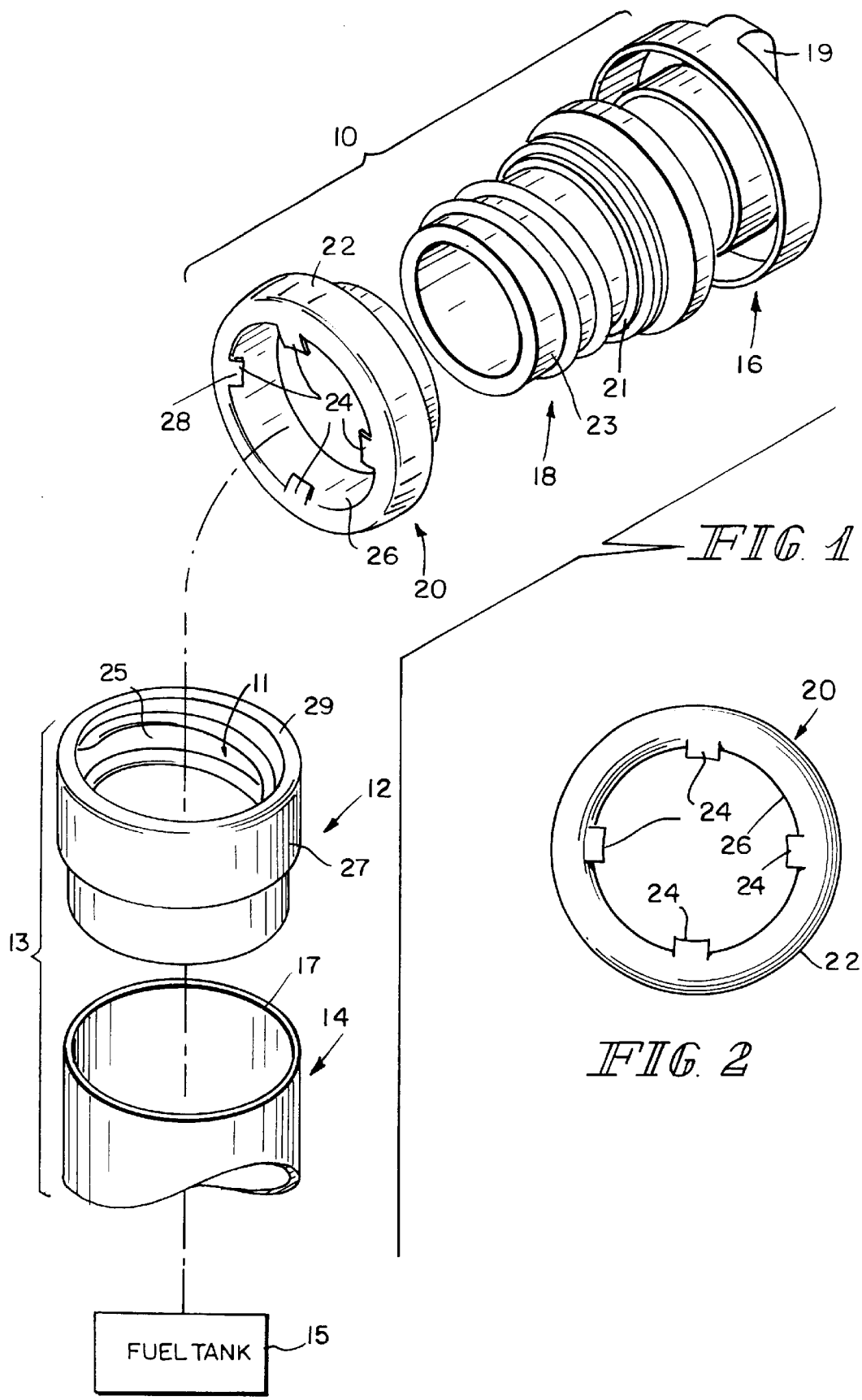
FIG. 1 is an exploded perspective view of a conductive filler neck coupled to a fuel tank, a filler neck insert sized to fit into the filler neck and receive a threaded fuel cap, and a fuel cap including (from right to left) a handle, a threaded closure member, and a retainer.
FIG. 2 is a bottom view of the retainer of FIG. 1 showing four flexible fingers appended to an annular member.

A fuel cap 10 is configured for use with a fuel receiving assembly 13. The fuel receiving assembly 13 includes a fuel tank filler neck 14 and tank filler neck insert 12 on the open end 17 thereof. The fuel cap 10 is engageable with the fuel receiving assembly 13 to close and seal an open mouth or fuel port 11 of tank filler neck insert 12. Tank filler neck insert 12 is made of an electrically conductive plastics material and portions of fuel cap 10 are also made of an electrically conductive plastics material. Once installed in the filler neck 14, the fuel cap 10 is electrically grounded to the fuel tank 15 via the electrically conductive filler neck insert 12 as shown, for example, in FIG. 4. Fuel tank 15 is of known construction and as such is shown diagrammatically in FIGS. 1, 3 and 4.

Figure 3:
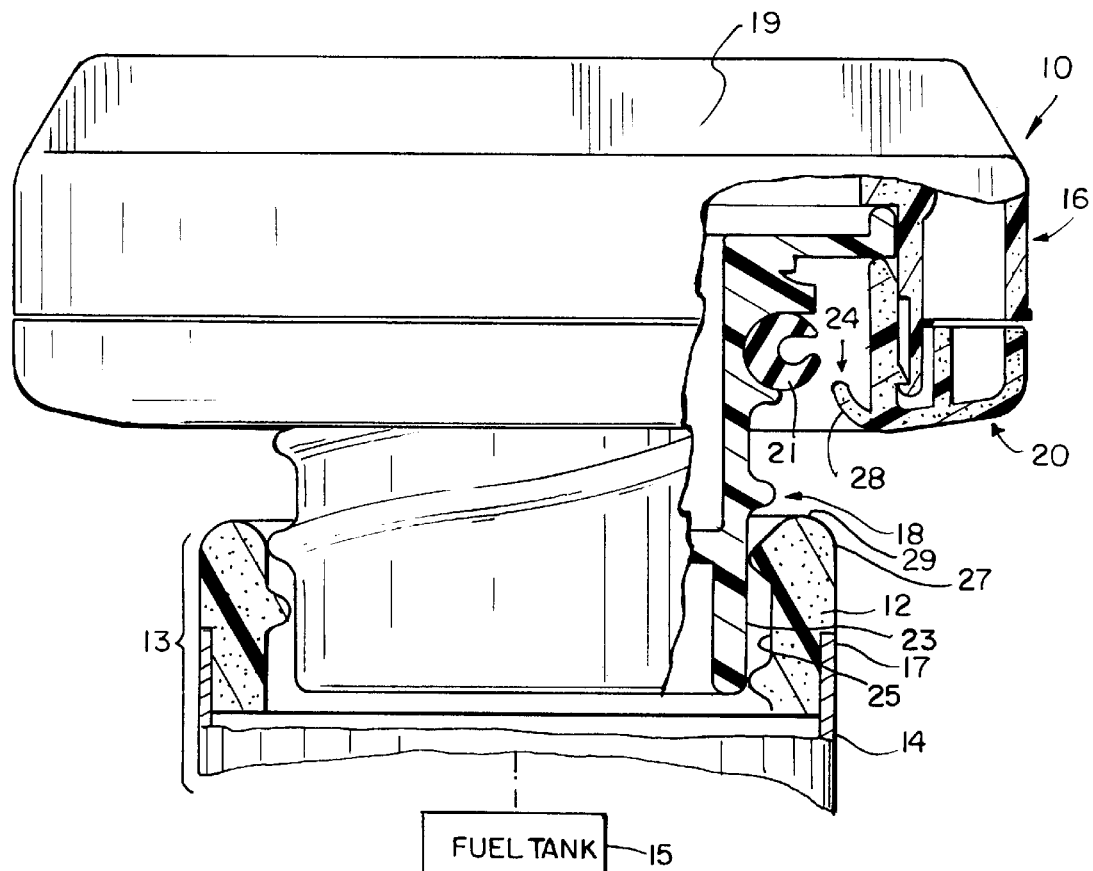
FIG. 3 is a side elevation of the fuel cap of FIG. 1, with portions broken away, as it is being inserted into the filler neck insert and the filler neck of FIG. 1.
Figure 4:
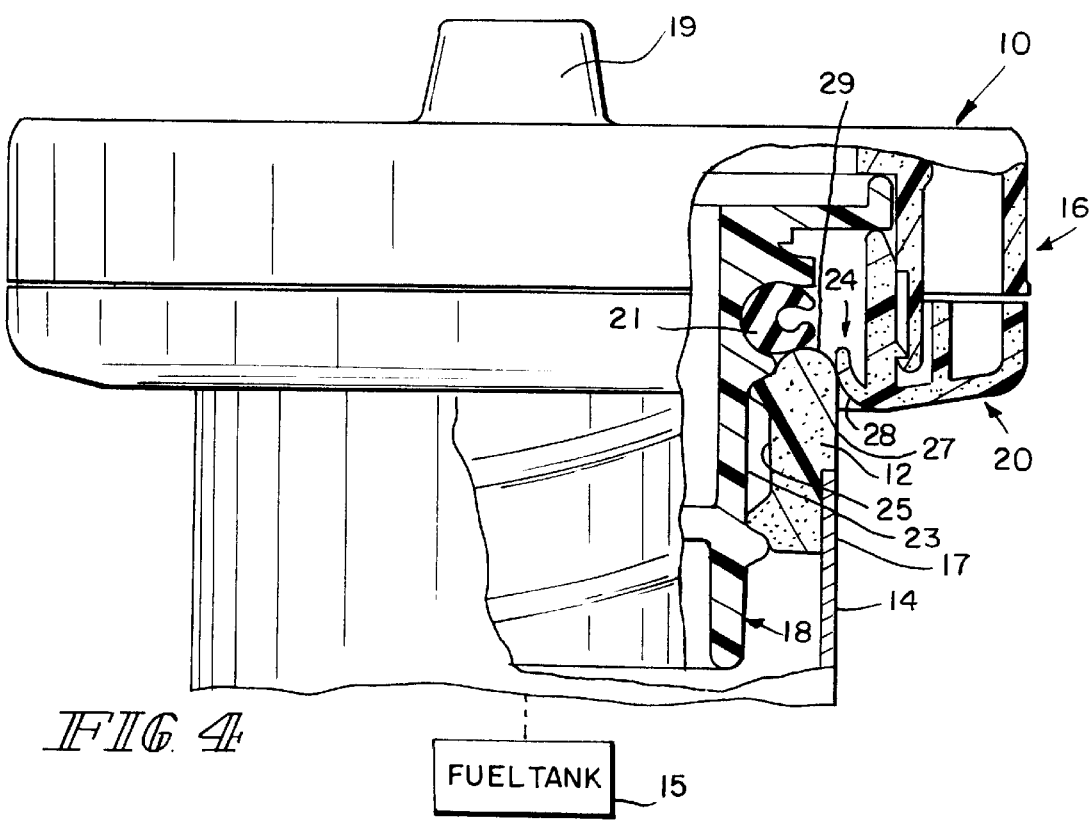
FIG. 4 is a view similar to FIG. 3 showing the fuel cap mounted in the filler neck and contact between the retainer and the filler neck insert.

As shown in FIGS. 1, 3, and 4, fuel cap 10 includes a handle 16 having a grip 19, a fuel port closure 18 under and spaced from the handle 16, and an electrically conductive retainer 20 arranged to couple or engage handle 16 to fuel port closure 18 yet, in certain embodiments, permit lost motion between handle 16 and fuel port closure 18. Handle 16 and retainer 20 are made of an electrically conductive material such as an electrically conductive plastics material. As shown in the Figures, fuel port closure 18 such as the threaded portion 23 is insertable into filler neck insert 12 to retain cap 10 in position to cover fuel port 11. With reference to FIGS. 3 and 4, fuel port closure 18 is sized and dimensioned for engaging at least an internal surface 25 of the insert 12 of fuel receiving assembly 13. Retainer 20 is sized and dimensioned and spaced away from fuel port closure 18 for contacting at least an external surface 27 of fuel receiving assembly 13.

A grounded connection is established between handle 16, retainer 20, filler neck inset 12, and filler neck 14 during installation of cap 10 in filler neck insert 12 and filler neck 14 so that cap 10 and the operator's handle become fully grounded before a sealed connection at O-ring seal 21 between closure member 16 and filler neck inset 12 (see FIG. 4) is broken during removal of cap 10 from filler neck 14 prior to refueling the fuel tank 15. The disclosure in Robert S. Harris' PCT International Publication No. WO99/05026 entitled "Fuel Cap" is hereby incorporated by reference herein.

To prevent a potential electrical discharge (spark) during cap removal, this filler neck closure system provides means for dissipating an electrical charge from an operator attempting to refuel the vehicle, who is at a first electrical potential, and the vehicle, specifically the metal fuel filler neck 14, which is at a second electrical potential, to reach a common level immediately prior to opening the cap 10 and releasing fuel vapor from fuel tank 15. Such means for dissipating an electrical charge include conductive components handle 16, closure 18, retainer 20 and fuel receiving assembly 13. These conductive components define a common electrically conductive path facilitating and establishing a common electrical potential.

To achieve this common level, cap 10 is provided with a handle cover 16 formed of an electrically conductive material such as molded of an electrically conductive polymer material. Attached to this cover 16 is a similarly conductive polymer retainer 20 designed to capture a non-conductive filler neck closure member 18 for purposes of holding the closure member 18 between the retainer 20 and the cover 16, and further to ensure a driving connection between cover 16 and closure member 18.

In the preferred embodiment as illustrated, the conductive polymer retainer 20 is constructed to have an annular member 22 and flexible members 24 projecting radially inwardly from an inner wall 26 of annular member 22. The flexible members 24 generally provide a degree of flexibility to positively bias towards insert 12 and mechanically and electrically contact with the vehicle fuel filler neck 14 or filler neck insert 12 as the cap 10 is installed. The vehicle fill neck 14 and/or insert 12, which are electrically conductive, are preferably at a common electrical potential with the vehicle fuel tank 15 and vehicle chassis. Thus, the operator will establish a common electrical potential with the vehicle as the operator touches the cap 10 preventing any spark discharge should inadvertent contact be made with any other part of the vehicle at the start of the cap-removal process. In an alternative embodiment, the flexible member is provided in the form of flexible, generally continuous internal, generally radially inwardly extending ring or flap. This form of the flexible member provides the same function as the portions 24 shown in FIGS. 1–4.

In the preferred embodiment, the inwardly projecting fingers 24 have a curved surface 28 which is in contact with the filler neck 14, this surface shape provides a smooth "feel" and gradual increase in effort as the cap 10 is installed in the filler neck and the fingers 24 are generally upwardly and outwardly deflected. Four fingers 24 arranged to lie in circumferentially spaced-apart relation on annular inner wall 22 are shown, for example, in FIGS. 1 and 2. As shown in FIGS. 3 and 4, these fingers 24 on the electrically conductive retainer 20 will establish electrical contact with the electrically conductive filler neck insert 12 during cap installation so that fuel cap 10 is grounded when it is installed in the filler neck 14.

The present invention also includes a method of establishing a common electrical potential and preventing escape of fuel vapors from the fuel port 11 prior to establishing the common electrical potential. The fuel cap 10 and fuel receiving assembly 13 as described herein above is used to provide the method of the invention. It should be noted that variations on the structure and embodiment of the fuel cap 10 and fuel receiving assembly 13 may be provided and still achieve the same method as described herein. The method includes the steps of sealing the fuel port when the cap 10 is engaged with the fuel receiving assembly 13. When cap 10 is engaged in assembly 13 fuel vapors are retained in the fuel receiving assembly 13 and fuel tank 15. Under these conditions threaded filler neck of fuel closer 18 is engaged with the correspondingly threaded internal surface 25. Seal 21 is engaged on an upper surface 29 of insert 12 to prevent the escape of fuel vapors through the engaged threads 23, 25. Also under these conditions the projecting portions 24 are biasedly engaged against the corresponding surface 27 of the insert 12. As such, a conductive path extends from the handle 16 through the component 20, 18 and fuel receiving assembly 13. This condition is generally shown in FIG. 4.

As cap 10 is rotated to remove it from fuel receiving assembly 13, threads 23 and 25 respectively threadedly disengage. As the cap is rotated the seal between seal 21 and corresponding surface 29 of the insert is maintained. Also as a rotation occurs contact is maintained between the fingers 24 and the corresponding surface 27, 29 of the insert 12. Seal 21 and fingers 24 are sized and dimensioned to maintain a contact between the fingers 24 and the insert 12 to maintain a conductive path from the cap 10 to fuel receiving assembly 13 as the seal is separated between seal 21 and insert 12. This allows the maintenance of an electrically conductive path between the electrically conductive retainer 20 and electrically conductive portion of the above fuel receiving assembly 13. This electrically conductive path is maintained while the engagement between seal 21 and insert 12 is disengaged. Disengagement of seal 21 from insert 12 allows vapors to escape. While vapors escape, conductive contact is maintained by the fingers 24 of retainer 20 contacting a corresponding surface of insert 12. Maintenance of the electrically conductive path prevents creating a spark gap which might otherwise allow a spark to discharge across such a gap. Generally, the common electrical potential is established shortly after a user grips handle 16 since the conductive path between the structure allows the electrical potential to be dissipated through the overall structure.

Although the invention has been described in detail with reference to a preferred embodiment, variations and modification exist within the scope and spirit of the invention as described and defined in the following claims.

What is claimed is:

1. A fuel cap for use with a fuel receiving assembly defining a fuel port and which establishes a common electrical potential with a fuel receiving assembly by way of an electrically conductive path from the cap to a fuel receiving assembly and prevents escape of fuel vapors from a fuel port prior to establishing common electrical potential, the fuel cap comprising:

a handle on the fuel cap, at least a portion of the handle and the cap being electrically conductive, a fuel port closure for engaging a fuel receiving assembly, an electrically conductive retainer coupled to the fuel cap, the retainer contacting the electrically conductive portion of the cap and a fuel receiving assembly for providing an electrically conductive path from the handle through the retainer to a fuel receiving assembly, a seal on the fuel cap for sealing a fuel port when the fuel cap is engaged with at least a portion of a fuel receiving assembly, the seal being positioned in the fuel cap for sealing a fuel port and preventing the escape of fuel vapors through a fuel port until substantially achieving a common electrical potential; and said electrically conductive retainer being sized and dimensioned for conductively contacting a fuel receiving assembly as said fuel cap is rotated for at least a portion of a full rotation while said fuel cap is being disengaged from a fuel receiving assembly to prevent defining a spark gap between said electrically conductive retainer and a fuel receiving assembly.

2. The cap of claim 1 wherein said fuel port closure is spaced from said handle and said seal is generally positioned between said fuel port closure and said handle, said retainer being attached to said handle and spaced from said seal and said fuel port closure.

3. The cap of claim 2 further comprising said retainer being spaced from said seal for receiving a portion of a fuel receiving assembly therebetween, said retainer and seal being sized and dimensioned for maintaining engagement of said seal with a fuel receiving assembly prior to disengagement of said retainer from a fuel receiving assembly.

4. The cap of claim 1 wherein said retainer includes an inwardly extending engaging portion which biasedly engages at least a portion of a fuel receiving assembly for maintaining a conductive electrical contact therebetween.

5. The cap of claim 1 wherein said retainer includes a plurality of fingers generally inwardly radially extending being sized and dimensioned to biasedly engage a corresponding surface of a fuel receiving assembly to provide electrically conductive engagement of said retainer with a fuel receiving assembly.

6. A fuel cap for engaging a fuel receiving assembly to removably seal a fuel port defined by a fuel receiving assembly, a fuel cap including a handle and a fuel port closure having a seal generally retained on said cap between said fuel port closure and an electrically conductive retainer, at least a portion of said handle and said cap being electrically conductive, said electrically conductive retainer being attached to said cap and contacting said conductive portion of said cap for providing an electrically conductive path from said handle to said retainer, said fuel port closure being sized and dimensioned for engaging at least an internal surface of a fuel receiving assembly, said retainer being adapted for flexibly and conductively contacting a conductive portion of an external surface of a fuel receiving assembly as said fuel cap is being disengaged and as vapors are permitted to escape between said cap and a fuel receiving assembly.

7. The cap of claim 6 wherein said fuel port closure is spaced from said handle and said seal is generally positioned between said fuel port closure and said handle, said retainer being attached to said handle and spaced from said seal and said fuel port closure.

8. The cap of claim 6 further comprising said retainer being spaced from said seal for receiving a portion of a fuel receiving assembly therebetween, said retainer and seal being sized and dimensioned for maintaining engagement of said seal with a fuel receiving assembly prior to disengagement of said retainer from a fuel receiving assembly.

9. The cap of claim 6 wherein said retainer includes an inwardly extending engaging portion which biasedly engages a portion of a fuel receiving assembly for maintaining a conductive electrical contact therebetween.

10. The cap of claim 6 wherein said retainer includes a plurality of fingers generally inwardly radially extending being sized and dimensioned to biasedly engage a corresponding surface of a fuel receiving assembly to provide electrically conductive engagement of said retainer with a fuel receiving assembly.

11. A method of establishing a common electrical potential and preventing escape of fuel vapors from a fuel port prior to establishing said common electrical potential, said method comprising the steps of:

providing a fuel receiving assembly defining a fuel port, providing a fuel cap for engagement with and covering of said fuel port, providing an electrically conductive retainer coupled to said fuel cap, providing a handle on said fuel cap, at least a portion of said handle and said fuel cap being electrically conductive, providing a fuel port closure for engaging said fuel receiving assembly, providing a seal on said fuel cap for sealing said fuel port when said fuel cap is engaged with at least a portion of said fuel receiving assembly, sealing said fuel port when said cap is engaged with said fuel receiving assembly, establishing a common electrically conductive path from said handle to said electrically conductive retainer and between said electrically conductive retainer and an electrically conductive portion of said fuel receiving assembly, maintaining an electrically conductive path from said handle to said electrically conductive retainer and between said electrically conductive retainer and said electrically conductive portion of said fuel receiving assembly, and disengaging said seal between said fuel cap and said fuel receiving assembly and maintaining the electrically conductive path from said handle to said fuel receiving assembly at least until fuel vapor has been permitted to escape between said fuel cap and said fuel receiving assembly.

12. A fuel cap for engaging a fuel receiving assembly to removably close a portion of the fuel receiving assembly, the fuel cap including:

a handle;

a closure depending from the handle;

the closure being sized and dimensioned for engagement with a portion of the fuel receiving assembly to at least cover a portion of the fuel receiving assembly;

at least a portion of the handle being electrically conductive;

an electrically conductive retainer carried on the cap;

the electrically conductive retainer being electrically coupled to the conductive portion of the cap for providing an electrically conductive path from the handle to the electrically conductive retainer;

the electrically conductive retainer being carried on the cap for conductively contacting at least a conductive portion of the fuel receiving assembly when the cap is in position sealing the fuel port, there being no conductive contact between the retainer and fuel assembly when the cap is removed; and the electrically conductive retainer being positioned on the cap and being adapted for conductively contacting the fuel receiving assembly as the cap is rotated for at least a portion of a full rotation while the cap is being disengaged from the fuel receiving assembly to prevent defining a spark gap between the electrically conductive retainer and the fuel receiving assembly.

13. The cap of claim 12, further comprising a seal retained on the cap proximate to the closure.

14. The cap of claim 13, wherein the seal is retained on the cap generally between the closure and the electrically conductive retainer.

15. The cap of claim 12, wherein the electrically conductive retainer is positioned on the cap for engaging an outside surface of the fuel receiving assembly.

16. The cap of claim 12, wherein the fuel port closure is spaced from the handle and the seal is generally positioned between the fuel port closure and the handle, and the electrically conductive retainer is attached to the handle and spaced from the seal and the fuel port closure.

17. The cap of claim 12, further comprising the electrically conductive retainer being spaced from the seal defining a space there between for receiving a portion of the fuel receiving assembly, the electrically conductive retainer and the seal being sized and dimensioned for maintaining engagement of the seal with the fuel receiving assembly prior to disengagement of the electrically conductive retainer from the fuel receiving assembly.

18. The cap of claim 12, wherein the electrically conductive retainer includes an extending, inwardly biased engaging portion for maintaining electrically conductive electrical contact with a portion of the fuel receiving assembly.

19. The cap of claim 12, wherein the electrically conductive retainer includes a plurality of generally flexible fingers positioned on the cap extending generally radially inwardly, the fingers biasedly engaging a surface of the fuel receiving assembly to provide flexible electrically conductive engagement of the retainer with the fuel receiving assembly.

20. The cap in claim 12 further comprising threads on at least a portion of the closure, the electrically conductive retainer maintaining conductive contact with at least a conductive portion of the fuel receiving assembly while the cap is being removed for maintaining an electrically conductive path between the cap and the fuel receiving assembly during a portion of the cap removal process.

21. A fuel cap for engaging a fuel receiving assembly to removably close a portion of a fuel receiving assembly, the fuel cap including:

a handle;

a closure attached to and extending from the handle;

the closure being sized and dimensioned for insertion into a portion of a fuel receiving assembly;

at least a portion of the handle being electrically conductive;

an electrically conductive retainer carried on the cap;

the electrically conductive retainer being electrically coupled to the conductive portion of the cap for providing an electrically conductive path from the handle to the electrically conductive retainer;

the electrically conductive retainer being carried on the cap and spaced from the closure for receiving a portion of a fuel receiving assembly between the closure and the retainer; and the electrically conductive retainer being positioned, sized and dimensioned for conductively contacting a fuel receiving assembly as the fuel cap is rotated for at least a portion of a full rotation while the cap is being disengaged from a fuel receiving assembly to prevent defining a spark gap between the retainer and a fuel receiving assembly.

22. The cap in claim 21 further comprising threads on at least a portion of the closure, the electrically conductive retainer maintaining conductive contact with at least a conductive portion of a fuel receiving assembly while the cap is being removed for maintaining an electrically conductive path between the cap and a fuel receiving assembly during a portion of the cap removal process.

23. A method of establishing a substantially common electrical potential in a fuel cap and a fuel receiving assembly, the method comprising the steps of:

providing a fuel receiving assembly;

providing a fuel cap for covering at least a portion of the fuel receiving assembly;

providing an electrically conductive retainer coupled to carried on the fuel cap;

providing a handle on the fuel cap, at least a portion of the handle and the fuel cap being electrically conductive;

providing a closure for covering at least a portion of the fuel receiving assembly;

sealing a fuel port when the cap is engaged with the assembly;

establishing a common electrically conductive path from the handle to the electrically conductive retainer;

establishing a common electrically conductive path from the electrically conductive retainer and an electrically conductive portion of the fuel receiving assembly;

maintaining an electrically conductive path from the handle to the electrically conductive retainer and between the electrically conductive retainer and the electrically conductive portion of the fuel receiving assembly while the cap is being removed during a portion of a cap removal process.

24. The method of claim 23, further comprising the step of:

providing a seal on the fuel cap for sealing the fuel port when the fuel cap is engaged with at least a portion of the fuel receiving assembly.

25. The method of claim 23 further comprising the step of:

disengaging the seal between the fuel cap and the fuel receiving assembly only after substantially achieving a common electrical potential between the fuel cap and the fuel receiving assembly to prevent defining a spark gap between the cap and the fuel receiving assembly.

26. A fuel cap for use with a fuel receiving assembly defining a fuel port and which establishes a common electrical potential with a fuel receiving assembly by way of an electrically conductive path from the cap to a fuel receiving assembly and prevents escape of fuel vapors from a fuel port prior to establishing common electrical potential, the fuel cap comprising:

a handle on the fuel cap, at least a portion of the handle and the cap being electrically conductive, a fuel port closure for engaging a fuel receiving assembly, an electrically conductive retainer coupled to the fuel cap, the retainer contacting the electrically conductive portion of the cap and being adapted for contacting a fuel receiving assembly for providing an electrically conductive path from the handle through the retainer to a fuel receiving assembly, a seal on the fuel cap for sealing a fuel port when the fuel cap is engaged with at least a portion of a fuel receiving assembly, the seal being positioned in the fuel cap for sealing a fuel port and preventing the escape of fuel vapors through a fuel port until substantially achieving a common electrical potential; and said electrically conductive retainer having means for maintaining a conductive path from the cap to a fuel receiving assembly as the seal is separated from a fuel receiving assembly.

27. The cap of claim 26 wherein said means for maintaining a conductive path from the cap to a fuel receiving assembly maintains conductive contact while vapors escape from between the cap and fuel receiving assembly.

28. A fuel cap for use with a fuel receiving assembly defining a fuel port and which establishes a common electrical potential with the fuel receiving assembly by way of an electrically conductive path from the cap to the fuel receiving assembly and prevents escape of fuel vapors from a fuel port prior to establishing common electrical potential, the fuel cap comprising:

a handle on the fuel cap, at least a portion of the handle and the cap being electrically conductive, a fuel port closure for engaging the fuel receiving assembly, an electrically conductive retainer coupled to the fuel cap, the retainer contacting the electrically conductive portion of the cap and being adapted for contacting the fuel receiving assembly for providing an electrically conductive path from the handle through the retainer to the fuel receiving assembly, a seal on the fuel cap for sealing a fuel port when the fuel cap is engaged with at least a portion of the fuel receiving assembly, the seal being positioned in the fuel cap for sealing the fuel port and preventing the escape of fuel vapors through the fuel port until substantially achieving a common electrical potential; and said electrically conductive retainer having means for establishing a conductive path from the cap to the fuel receiving assembly and for causing a gradual increase in effort as the seal is joined to the fuel receiving assembly.

29. A fuel cap for use with a fuel receiving assembly defining a fuel port and which establishes a common electrical potential with a fuel receiving assembly by way of an electrically conductive path from the cap to a fuel receiving assembly and prevents escape of fuel vapors from a fuel port prior to establishing common electrical potential, the fuel cap comprising:

a handle on the fuel cap, at least a portion of the handle and the cap being electrically conductive, a fuel port closure for engaging a fuel receiving assembly, an electrically conductive retainer coupled to the fuel cap, the retainer contacting the electrically conductive portion of the cap and a fuel receiving assembly for providing an electrically conductive path from the handle through the retainer to a fuel receiving assembly, a first continuous flexible member on the fuel cap for sealing a fuel port to prevent the escape of fuel vapors when the fuel cap is engaged with at least a portion of a fuel receiving assembly;

a second continuous flexible member on the retainer adapted to maintain conductive contact with a fuel receiving assembly to prevent defining a spark gap as the cap is initially disengaged.

30. A fuel cap for use with a fuel receiving assembly defining a fuel port and which establishes a common electrical potential with a fuel receiving assembly by way of an electrically conductive path from the cap to a fuel receiving assembly and prevents escape of fuel vapors from a fuel port prior to establishing common electrical potential, the fuel cap comprising:

a handle on the fuel cap, at least a portion of the handle and the cap being electrically conductive, a fuel port closure for engaging a fuel receiving assembly, an electrically conductive retainer coupled to the fuel cap, the retainer contacting the electrically conductive portion of the cap and being adapted for contacting a fuel receiving assembly for providing an electrically conductive path from the handle through the retainer to a fuel receiving assembly, a seal on the fuel cap for sealing a fuel port when the fuel cap is engaged with at least a portion of a fuel receiving assembly, the seal being positioned in the fuel cap for sealing a fuel port and preventing the escape of fuel vapors through a fuel port until substantially achieving a common electrical potential; and whereby said electrically conductive retainer maintains a conductive path at more than one point from the cap to a fuel receiving assembly as the seal is separated from a fuel receiving assembly.

* * * * *